US008418827B2

(12) United States Patent
Ishida et al.

(10) Patent No.: US 8,418,827 B2

(45) Date of Patent: Apr. 16, 2013

(54) DRIVING DEVICE

(75) Inventors: Toshihiko Ishida, Niwa-gun (JP); Tsutomu Takeuchi, Gamagori (JP); Shigeyuki Miyazaki, Suzuka (JP); Shin Sakai, Aichi-ken (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 338 days.

(21) Appl. No.: 12/947,253

(22) Filed: Nov. 16, 2010

(65) Prior Publication Data

US 2011/0121693 A1 May 26, 2011

(30) Foreign Application Priority Data

Nov. 20, 2009 (JP) ................................ 2009-265140
Nov. 20, 2009 (JP) ................................ 2009-265141

(51) Int. Cl.

*F16D 27/112* (2006.01)
*F16D 27/10* (2006.01)
*E05F 15/14* (2006.01)

(52) U.S. Cl.

USPC .................. 192/84.961; 324/207.25; 49/360; 192/30 W

(58) Field of Classification Search ................ 310/68 B; 192/30 W, 84, 961, 96; 49/349, 360; 296/146.4; 335/205–207; 338/32 H; 324/207.2, 207.25

See application file for complete search history.

(56) References Cited

U.S. PATENT DOCUMENTS

| | | | | |
|---|---|---|---|---|
| 4,340,133 | A * | 7/1982 | Blersch | 192/30 W |
| 6,163,125 | A * | 12/2000 | Bernauer et al. | 318/626 |
| 6,397,523 | B1 | 6/2002 | Fukumoto et al. | |
| 6,405,485 | B1 * | 6/2002 | Itami et al. | 49/280 |
| 6,408,573 | B1 | 6/2002 | Fukumoto et al. | |
| 6,425,206 | B1 * | 7/2002 | Noda et al. | 49/360 |
| 7,237,960 | B2 * | 7/2007 | Oohira et al. | 384/448 |
| 8,256,161 | B2 * | 9/2012 | Nagai et al. | 49/360 |
| 2011/0011697 | A1 * | 1/2011 | Ishida et al. | 192/84.95 |
| 2011/0036678 | A1 * | 2/2011 | Hashizume et al. | 192/84.91 |

FOREIGN PATENT DOCUMENTS

| | | | |
|---|---|---|---|
| JP | 2000-177391 | A | 6/2000 |
| JP | 2000-179233 | A | 6/2000 |

* cited by examiner

*Primary Examiner* — Burton Mullins

(74) *Attorney, Agent, or Firm* — Buchanan Ingersoll & Rooney PC

(57) ABSTRACT

A driving device includes a first rotating member, an armature member being movable and rotatable together with, a second rotating member being rotatable relative to the armature member, a magnetic force generating portion for generating a magnetic force for attracting the armature member toward the second rotating member in order to establish a connection between the armature member and the second rotating member so as to be integrally rotatable, a sensor magnet fixed to the second rotating member, a sensor provided for detecting a change of the magnetic field and a fixing member formed with a first claw portion engaged with the second rotating member and a second claw portion engaged with the sensor magnet while being press-fitted thereto in a radial direction thereof, wherein the sensor magnet is fixed to the second rotating member by means of the fixing member.

15 Claims, 4 Drawing Sheets

DRIVING DEVICE

CROSS REFERENCE TO RELATED APPLICATIONS

This application is based on and claims priority under 35 U.S.C. §119 to Japanese Patent Application 2009-265140, filed on Nov. 20, 2009 and Japanese Patent Application 2009-265141, filed on Nov. 20, 2009, the entire content of which is incorporated herein by reference.

TECHNICAL FIELD

This disclosure relates to an electromagnetic clutch provided at a driving device.

BACKGROUND DISCUSSION

A known driving device of a slide door for a vehicle, disclosed in JP2000-177391A and JP2000-179233, includes an electromagnetic clutch having a first rotating member, an armature member, a second rotating member and a magnetic force generating means. The first rotating member is rotated by a motor serving as a power source, the armature member is connected to the first rotating member by means of a plate spring having a flexibility in an axial direction thereof, the second rotating member is arranged so as to face the armature member in the axial direction thereof, and the magnetic force generating means generates a magnetic force by which the plate spring is deformed in such a way that the armature member is press-fitted to the second rotating member so as to rotate integrally.

Specifically, according to the driving device in JP2000-179233A, the electromagnetic clutch includes a sensor magnet fixed to the second rotating member rotating in response to a position of the slide door to be opened or closed and serving to generate a magnetic field changing in a circumferential direction thereof. The electromagnetic clutch further includes a sensor arranged so as to face the sensor magnet and serving to detect the change of the magnetic field. The sensor magnet is formed in an annular shape and is fixed to the second rotating member approximately along an outer circumferential surface by means of adhesive agent or the like.

Because the sensor magnet is fixed to the second rotating member by means of the adhesive agent, a level of mountability of the sensor magnet to the second rotating member is lowered, at the same time a manufacturing time may be extended because a time for drying the adhesive agent is needed, thereby increasing a cost of the driving device.

Furthermore, in a case where the sensor magnet is solidly fixed to the second rotating member made of other materials, because each member has a different heat expansion coefficient, the sensor magnet may be broken because of a difference of the heat expansion coefficients therebetween. Further, the sensor magnet is fixed to the second rotating member at a surface formed so as to extend in an axial direction thereof while a clearance in a radial direction is provided between the sensor magnet and the second rotating member, the sensor magnet may not be appropriately positioned in the radial direction thereof, and further, an error may occur at the sensor because of the misalignment of an axial center of the sensor magnet relative to an axial center of a rotating shaft.

According to the driving device in JP2000-177391A, the plate spring of the electromagnetic clutch is formed with a small annular portion, at which the plate spring is connected to the first rotating member by means of a tightening member such as a screw, a rivet or the like, a large annular portion at which the plate spring is connected to the armature member by means of a tightening member such as a screw, a rivet or the like, and connecting pieces, arranged in a circumferential direction of the plate spring, in order to connect the small annular portion to the large annular portion in a radial direction of the plate spring. Specifically, according to the electromagnetic clutch mentioned above, the connecting pieces of the plate spring is deformed by means of the magnetic force generated by the magnetic force generating means, so that the armature member is press-fitted to the second rotating member in order to establish an engagement therebetween so as to rotate integrally. In a state where the magnetic force generating means is not energized, the armature member is not moved toward the second rotating member so that the plate spring (at the connecting pieces) is not deformed, thereby disengaging the armature member from the second rotating member. In this state, a rotational force of the second rotating member is not transmitted to the motor, and the slide door for the vehicle is manually operatable by a user.

However, according to such electromagnetic clutch in this configuration, because the plate spring is connected to the first rotating member at the small annular portion of the plate spring by means of the tightening member such as the screw, a rivet or the like, a load is intensively applied to a connecting portion between the small annular portion and the first rotating member (e.g., the tightening member or a through hole with which the tightening member is engaged). Specifically, because the small annular portion has a small diameter arranged radially inwardly relative to the large annular portion to which the armature member is connected, the load is intensively applied to the connecting portion between the small annular portion and the first rotating member. Accordingly, the plate spring may be deformed at the connecting portion thereof, and the plate spring may be designed so as to increase its thickness more than necessary.

A need thus exist to provide an electromagnetic clutch, which is not susceptible to the drawback mentioned above.

SUMMARY

According to an aspect of this disclosure, a driving device includes a first rotating member driven so as to rotate, an armature member being movable in an axial direction thereof together with the first rotating member and being rotatable integrally with the first rotating member, a second rotating member facing the armature member in the axial direction thereof and being rotatable relative to the armature member, a magnetic force generating portion for generating a magnetic force by being energized, the magnetic force being used for attracting the armature member toward the second rotating member in order to establish a connection between the armature member and the second rotating member so as to be integrally rotatable, a sensor magnet fixed to the second rotating member for generating a magnetic field that changes in a circumferential direction of the sensor magnet, a sensor provided so as to face the sensor magnet in order to detect a change of the magnetic field and a fixing member formed with a first claw portion and a second claw portion, the first claw portion engaged with the second rotating member while being press-fitted thereto in a radial direction thereof and the second claw portion engaged with the sensor magnet while being press-fitted thereto in a radial direction thereof, wherein the sensor magnet is fixed to the second rotating member by means of the fixing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment related to this disclosure will be explained in accordance with FIGS. 1 through 6. A driving device according to the embodiment is connected to a slide door for a vehicle by means of a cable or the like and is used for actuating the slide door so as to be opened or closed.

Figure 1:
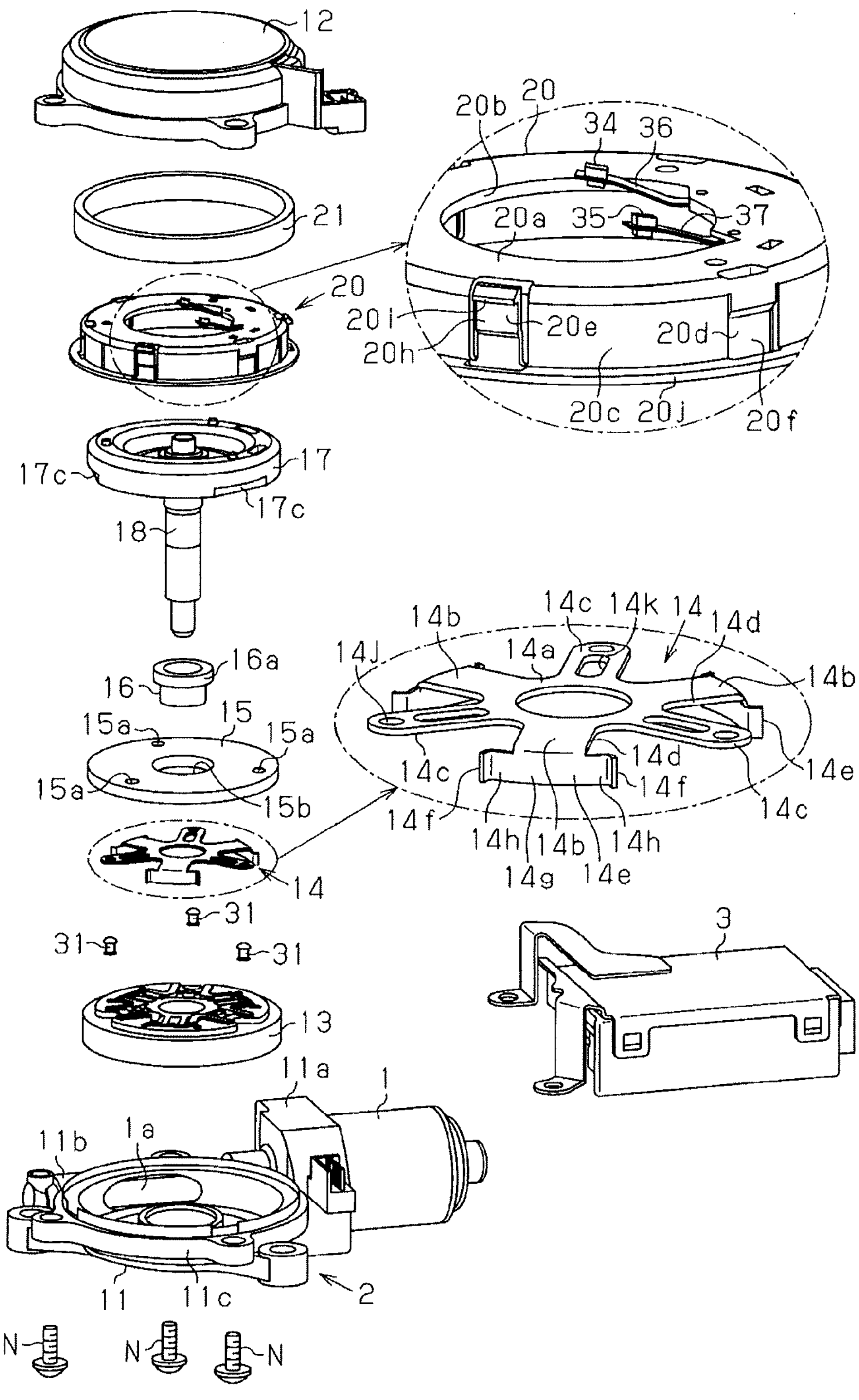
FIG. 1 illustrates an exploded perspective view of a driving device according to an embodiment.

As shown in FIG. 1, the driving device of the embodiment includes a motor 1 serving as a power source, an output portion 2 assembled to the motor 1 and a control circuit portion 3 assembled to the output portion 2. The motor 1 is used for the driving device of the embodiment and is actuated by a direct current (e.g., a direct current motor) for driving a worm 1*a* so as to rotate. The worm 1*a* is provided at a case 11 of the output portion 2 so as to protrude inwardly.

The output portion 2 includes the case 11, a case cover 12, a worm wheel 13, a plate spring 14, an armature member 15, a bearing 16, a rotor 17, a rotation shaft 18, a coil member 19 (see FIG. 2), a fixing member 20, a sensor magnet 21, a hall IC 22 (see FIG. 2) serving as a sensor, and the like. An electromagnetic clutch of the driving device according to the embodiment is configured by the worm wheel 13 serving as a first rotating member, the plate spring 14, the armature member 15, the bearing 16, the rotor 17 serving as a second rotating member and the coil member 19 (see FIG. 2) serving as a magnetic force generating means. The housing is configured by the case 11 and the case cover 12.

Figure 2:
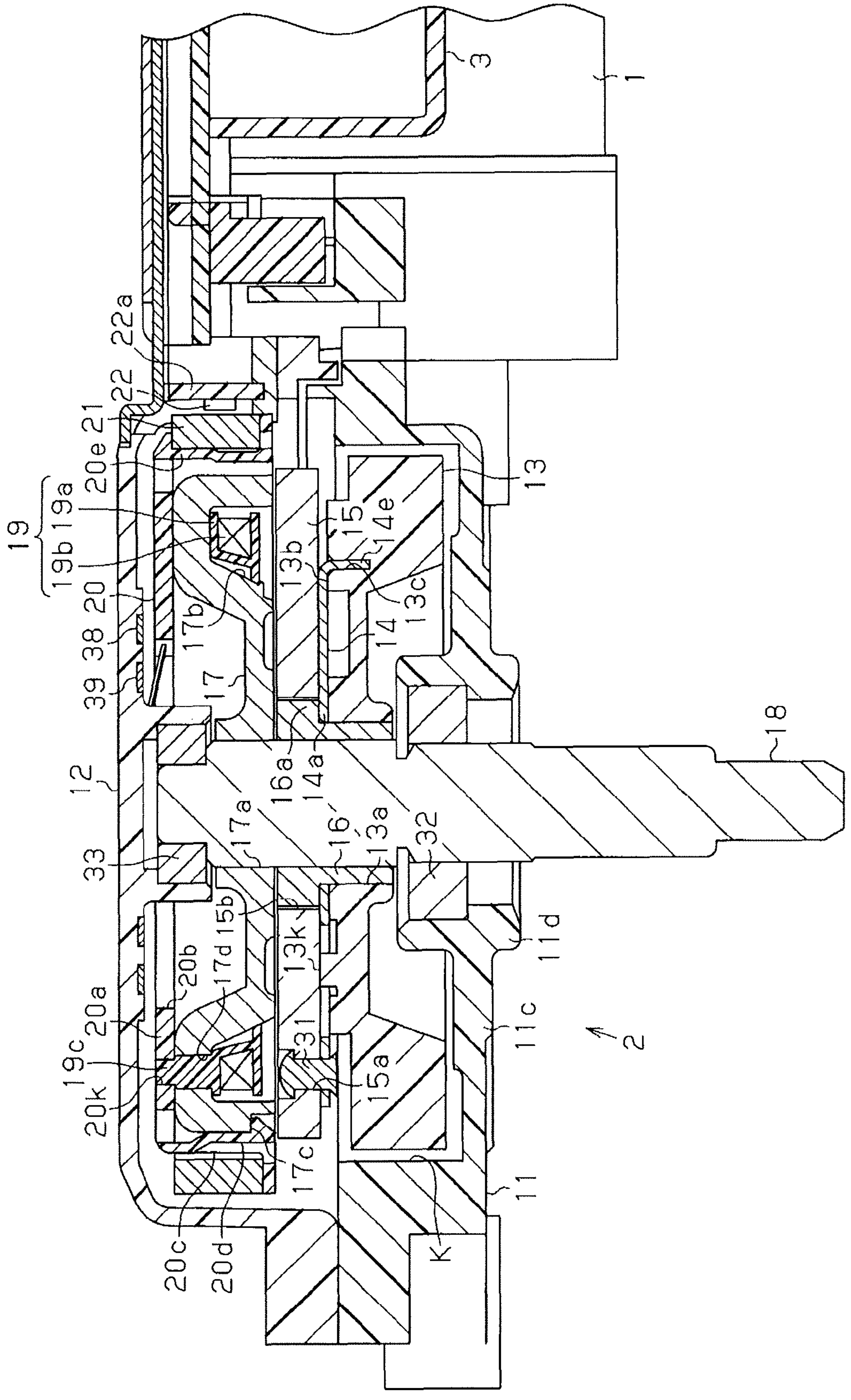
FIG. 2 illustrates a cross section of the driving device according to the embodiment.

The case 11 includes a fixing portion 11*a* by which the case 11 is fixed to the motor 1, a worm housing portion 11*b* within which the worm 1*a* is housed and a wheel housing recessed portion 11*c* within which the worm wheel 13 is housed. The worm housing portion 11*b* is formed in a cylindrical shape so as to extend from the fixing portion 11*a*, and the wheel housing recessed portion 11*c* is formed in a cylindrical shape having a bottom. The wheel housing recessed portion 11*c* has an axis extending in a direction orthogonal to the worm 1*a* and is arranged so as to communicate with the worm housing portion 11*b*. At the bottom portion of the wheel housing recessed portion 11*c*, a cylinder portion 11*d* is formed so as to protrude outwardly and inwardly and passing through the bottom portion of the wheel housing recessed portion 11*c* as illustrated in FIG. 2. The cylinder portion 11*d* has an axis being identical to that of the wheel housing recessed portion 11*c*.

As indicated in FIGS. 1 and 2, the case cover 12 is formed in a cylinder shape having a bottom and is fixed to the case 11 by means of bolts N in such a way that an end portion of an opening of the case cover 12 contacts an end portion of an opening of the wheel housing recessed portion 11*c* so that an approximately sealed-housing space K (hereinafter referred to as housing space K) is defined therebetween.

The worm wheel 13 is rotatably provided within the housing space K (e.g., the housing space K within the wheel housing recessed portion 11*c*) in such a way that the worm wheel 13 meshes the worm 1*a*, thereby rotating the worm wheel 13 by the rotation of the worm 1*a*. In each diagram, gear portions of the worm 1*a* and the worm wheel 13 are not illustrated in FIGS. 1 and 2.

Figure 3:
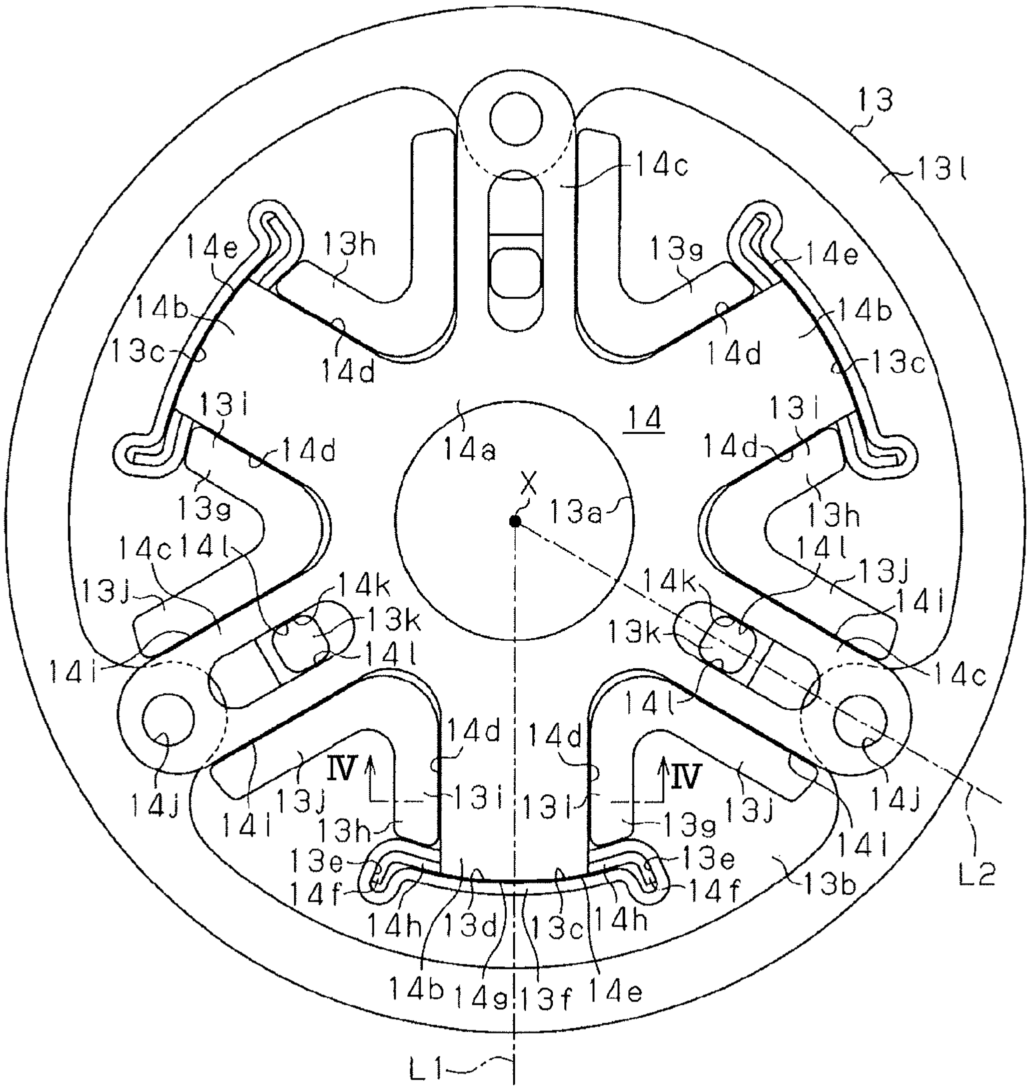
FIG. 3 illustrates a plane view of a worm wheel and a plate spring of the driving device according to the embodiment.

The armature member 15 is provided so as to be integrally rotatable with the worm wheel 13 via the plate spring 14 that has a flexibility in an axial direction thereof. Specifically, the worm wheel 13 of the embodiment is made of resin and is formed in an approximate disc shape having a center through hole 13*a* as illustrated in FIG. 3. On one surface of the worm wheel 13 (an upper surface in FIG. 2 being close to the case cover 12), a plurality of press-fit receiving portions 13*c* are formed in a recessed manner. According to the embodiment, three press-fit receiving portions 13*c* are equiangularly formed so as to have an interval of 120 degrees therebetween in a circumferential direction of the worm wheel 13. Each of the press-fit receiving portions 13*c* is formed so as to include a circumferentially extending recessed portion 13*d* and radially extending recessed portions 13*e*. The circumferentially extending recessed portion 13*d* is formed so as to extend in a circumferential direction of the worm wheel 13 relative to an axis X thereof. The radially extending recessed portions 13*e* are formed so as to extend radially outwardly from both ends of the circumferentially extending recessed portions 13*d* in the circumferential direction. The press-fit receiving portion 13*c* is formed with a slope surface 13*f* extending at around an opening portion thereof. The slope surface 13*f* is formed so as to tilt from the one end surface of the worm wheel 13 toward the bottom portion of the press-fit receiving portion 13*c*.

Figure 4:
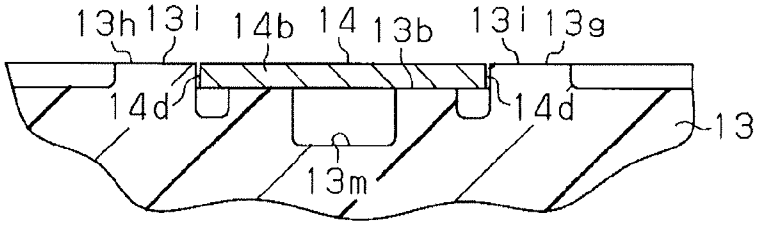
FIG. 4 illustrates a cross section of the driving device seen in IV-IV line in FIG. 3.

On a first end surface 13*b* of the worm wheel 13, a plurality of engagable protruding portions 13*g* and 13*h* are formed as indicated in FIGS. 3 and 4. According to the embodiment, three pairs of the engagable protruding portions 13*g* and 13*h* (six engagable protruding portions in total) are equiangularly formed so as to have an interval of 120 degrees therebetween in the circumferential direction of the worm wheel 13. The pair of the engagable protruding portions 13*g* and 13*h* are provided so as to be symmetrical relative to straight line L1 seen in an axial direction of the worm wheel 13, the straight line L1 being set so as to pass through the axis X and a center of the press-fit receiving portion 13*c* in the circumferential direction of the worm wheel 13. Each of the engagable protruding portions 13*g* and 13*h* is formed so as to include a first power transmitting portion 13*i* and a second power transmitting portion 13*j*. The engagable protruding portions 13*g* and 13*h* are arranged in such a way that the first power transmitting portions 13*i* extend so as to be parallel to the straight line L1 seen in the axial direction of the worm wheel 13 and the second power transmitting portions 13*j* extend so as to be parallel to the straight line L2 in the axial direction of the worm wheel 13. The straight line L2 is set so as to pass through the axis X and a center of the interval between the press-fit receiving portions 13*c* provided adjacent to each other in the circumferential direction of the worm wheel 13. Each of the engagable protruding portions 13*g* and 13*h* are formed in such a way that the first power transmitting portion 13*i* and the second power transmitting portion 13*j* are connected at radially inner ends thereof so as to form a V-shape whose edge is rounded and protruded toward the axis X. On the first end surface 13*b* of the worm wheel 13, subsidiary engagable protruding portions 13*k* are formed on the straight line L2 between the second power transmitting portions 13*j* provided adjacent to each other. Further, on the first end surface 13*b* of the worm wheel 13, a step portion 13*l* is formed at a radially outer end portion of the worm wheel 13 and a radially outer portion of the subsidiary engagable protruding portion 13*k* in such a way that a surface of the step portion 13*l* is set so as to be lower than the first end surface 13*b*. Furthermore, on the first end surface 13*b* of the worm wheel 13, recessed portions 13*m* are formed so as to extend in the radial direction of the worm wheel 13 along a lines corresponding to the straight line L1 (at a center of the interval between the press-fit receiving portions 13*c* provided adjacent to each other in the circumferential direction of the worm wheel 13).

The plate spring 14 is formed with an annular portion 14*a*, a plurality of power transmitting pieces 14*b* and a plurality of flexible pieces 14*c*. The power transmitting pieces 14*b* are arranged in a circumferential direction of the plate spring 14 so as to extend in a radial direction of the plate spring 14 from the annular portion 14*a* and be fitted into the worm wheel 13. The flexible pieces 14*c*, being more flexible than the power transmitting pieces 14*b*, are arranged in the circumferential direction of the plate spring 14 so as to extend in the radial direction of the plate spring 14 from the annular portion 14*a* and be connected to the armature members 15. According to the embodiment, three power transmitting pieces 14*b* and three flexible pieces 14*c* are equiangularly and alternately formed so as to have an interval of 60 degrees therebetween in the circumferential direction of the plate spring 14.

The annular portion 14*a* has an internal diameter that is approximately identical to an internal diameter of the worm wheel 13 (a diameter of the center through hole 13*a*) and has an external diameter that is slightly smaller than an imaginary circle formed by connecting radially inner ends of the engagable protruding portions 13*g* and 13*h*.

Each of the power transmitting pieces 14*b* includes rotationally engaging surfaces 14*d* with which the engagable protruding portions 13*g* and 13*h* (specifically at side surfaces of the first power transmitting portions 13*i*) are engagable in a rotational direction of the worm wheel 13. The rotationally engaging surface 14*d* is formed on a surface that extends in a thickness direction of the plate spring 14. Specifically, a width of the power transmitting piece 14*b* seen in the axial direction of the plate spring 14 is approximately identical to the interval between the engagable protruding portions 13*g* and 13*h* provided as a pair (specifically, an interval between side surfaces of the first power transmitting portions 13*i*, provided adjacent to each other). According to the embodiment, the width of the power transmitting piece 14*b* is set so as to be slightly smaller than the interval between the engagable protruding portions 13*g* and 13*h* so that, during an assembling operation, the power transmitting piece 14*b* is smoothly inserted between the first power transmitting portions 13*i* in the axial direction of the worm wheel 13. Both side surfaces of the power transmitting piece 14*b* extending in the radial direction of the plate spring 14 are set as the rotationally engaging surfaces 14*d*. A height of each of the engagable protruding portions 13*g* and 13*h* in the axial direction of the worm wheel 13 (specifically, a height of the side surface of the first power transmitting portion 13*i*) is set so as to be approximately identical to the thickness of the power transmitting piece 14*b* that has a same thickness as a metal plate used for the plate spring 14 as a material.

Further, as illustrated in FIGS. 1 and 3, the power transmitting piece 14*b* includes a press-fit portion 14*e* formed by bending so as to extend in the thickness direction of the plate spring 14, and the plate spring 14 is connected to the worm wheel 13 at the power transmitting piece 14*b* in such a way that the press-fit portion 14*e* is press-fitted into the press-fit receiving portion 13*c*. The press-fit portion 14*e* is formed so as to include press-fit rotationally engaging portions 14*f*, outwardly extending in the radial direction of the plate spring 14, at which the press-fit portion 14*e* is engaged with an inner wall of the press-fit receiving portion 13*c* in a rotational direction. Specifically, the press-fit portion 14*e* includes a bending portion 14*g*, arc portions 14*h* and the press-fit rotationally engaging portions 14*f*. The bending portion 14*g* is formed by bending at a radially outer end portion of the power transmitting piece 14*b* so as to have a surface that is orthogonal to the radial direction of the plate spring 14. Each of the arc portions 14*h* is formed so as to protrude in a circumferential direction of the plate spring 14 from each end of the bending portion 14*g* in the circumferential direction. Each of the press-fit rotationally engaging portions 14*f* is formed by bending so as to extend in the radial direction of the plate spring 14 from an end of each of the arc portions 14*h*. In this configuration, once the press-fit portion 14*e* is press-fitted into the press-fit receiving portion 13*c*, the press-fit rotationally engaging portion 14*f* press-contacts the inner wall of the press-fit receiving portion 13*c* (at the radially extending recessed portion 13*e*) in the circumferential direction of the worm wheel 13. Specifically, because of the arc portion 14*h* extending in the circumferential direction and the press-fit rotationally engaging portion 14*f* bending from the end of the arc portion 14*h*, the press-fit portion 14*e* has an appropriate resilience for pressing the press-fit rotationally engaging portion 14*f* to the inner wall (the surface extends along the radial direction of the worm wheel 13) of the radially extending recessed portion 13*e* of the press-fit receiving portion 13*c*.

The flexible piece 14*c* includes first output side rotationally engaging surfaces 14*i* formed at surfaces extending in the thickness direction of the flexible piece 14*c* so as to engage with the engagable protruding portions 13*g* and 13*h* (side surfaces of the second power transmitting portions 13*j*) in the rotational direction of the worm wheel 13. Specifically, a width of the flexible piece 14*c* seen in the axial direction of the plate spring 14 is approximately identical to the interval set between side surfaces of the second power transmitting portions 13*j* provided adjacent to each other. According to the embodiment, the width of the flexible piece 14*c* is set so as to be slightly smaller than the interval between side surfaces of the second power transmitting portions 13*j* provided adjacent to each other, so that, during the assembling operation, the flexible piece 14*c* is smoothly inserted between the side surfaces of the second power transmitting portions 13*j* in the axial direction of the worm wheel 13. Both side surfaces of thee flexible piece 14*c* extending in the radial direction of the plate spring 14 are set as the first output side rotationally engaging surfaces 14*i*.

Each of the flexible pieces 14*c* is formed with a fastening through hole 14*j* and a through hole 14*k*. The fastening through hole 14*j* is formed at a radially outer end portion of each of the flexible pieces 14*c*, and the thorough hole 14*k* is formed at an intermediate portion of each of the flexible pieces 14*c* in a radial direction thereof (at a radially inner portion relative to the fastening through hole 14*j*). Both of the fastening through hole 14*j* and the through hole 14*k* are formed so as to pass through the flexible piece 14*c* in the thickness direction thereof. Because of the through hole 14*k*, the flexible piece 14*c* can obtain an intended spring characteristic (a flexibility in the axial direction of the plate spring 14). Inner side surfaces of the through hole 14*k* of each flexible piece 14*c* (a surface of the through hole 14*k* along the thickness direction of the flexible piece 14*c*) are set as a second output side rotationally engaging surface 14*l* being engagable with the subsidiary engagable protruding portion 13*k* in the rotational direction of the worm wheel 13. A width of the through hole 14*k* in a direction orthogonal to the radial direction of the plate spring 14 is set to be approximately identical to that of the subsidiary engagable protruding portion 13*k*. According to the embodiment, the width of the through hole 14*k* in the above explained direction is slightly larger than that of the subsidiary engagable protruding portion 13*k* so that the subsidiary engagable protruding portion 13*k* can be smoothly inserted thereinto in the axial direction of the plate spring 14. The inner side surfaces of the through hole 14*k*, extending in the radial direction of the plate spring 14, is set as the second output side rotationally engaging surfaces 14*l*.

In this configuration, as illustrated in FIG. 2, the plate spring 14 is fixed to the armature member 15 by means of rivets 31 each of which is passing through the fastening through hole 14*j* of the flexible piece 14*c* and a fastening through hole 15*a* of the armature member 15. The armature member 15 is made of a magnetic material and is formed in an approximately disk shape having a center through hole 15*b* at a center thereof, and a plurality of fastening through holes 15*a* are equiangularly formed in the circumferential direction of the armature member 15. According to the embodiment, three fastening through holes 15*a* are equiangularly formed so as to have an interval of 120 degrees therebetween in the circumferential direction of the armature member 15. A diameter of the center through hole 15*b* is set so as to be larger than a diameter of an internal diameter of the worm wheel 13 (e.g., a diameter of the center through hole 13*a*) and an internal diameter of the annular portion 14*a*. When the coil member 19 (see FIG. 2) is not energized, the flexible pieces 14*c* of the plate spring 14 are not deformed so that the annular portion 14*a* and the power transmitting pieces 14*b* (except the press-fit portions 14*e*) are located on a same plane, accordingly the armature member 15 is maintained in an pulled state toward the worm wheel 13.

The bearing 16 is fixed in the center through hole 13*a* of the worm wheel 13, and the rotation shaft 18 integrally rotating with the rotor 17 is inserted into the bearing 16 so as to be relatively rotatable. The bearing 16 is a metal bearing and is formed in an approximate cylinder shape so that the bearing 16 is press-fitted into the center through hole 13*a*. The bearing 16 is formed integrally with a regulating portion 16*a* by which the annular portion 14*a* of the plate spring 14 is regulated so as not move in the axial direction of the plate spring 14 relative to the worm wheel 13. The regulating portion 16*a* is formed at one end of the bearing 16 relative to the center through hole 13*a* (upper end in FIG. 2) radially outwardly extending so as to form a flange. In this configuration, the plate spring 14 is arranged so as to be sandwiched between the regulating portion 16*a* of the bearing 16 and the first end surface 13*b* of the worm wheel 13. An external diameter of the regulating portion 16*a* is set so as to be slightly smaller than a diameter of the center through hole 15*b* of the armature member 15.

The rotor 17 is provided so as to face the armature member 15 in an axial direction of the rotor 17 and to be relatively rotatably with the armature member 15. The rotor 17 is made of a magnetic material and is formed in an approximate disk shape having a center through hole 17*a* at a center thereof as illustrated in FIG. 2. The rotation shaft 18 is press-fitted into the center through hole 17*a* of the rotor 17. The rotation shaft 18 is rotatably supported by a bearing 32 provided at the cylinder portion 11*d* of the case 11 and a bearing 33 provided at a bottom portion of the case cover 12, so that the rotor 17 is rotatably provided so as to face the armature member 15 in the axial direction of thereof. As mentioned above, the worm wheel 13 is rotatably supported by the rotation shaft 18 in such a way that the rotation shaft 18 is inserted into the bearing 16 fixed to the worm wheel 13. The rotor 17 is arranged in such a way that a surface of the rotor 17 facing the armature member 15 (at the other end side of the rotor 17 in the axial direction thereof, a lower surface of the rotor 17 in FIG. 2) is slightly distant (distant by ⅓ of the thickness of the plate spring 14) from the armature member 15 in a condition where the coil member 19 (see FIG. 2) is not energized, in other words, the armature member 15 is in the pulled state toward the worm wheel 13.

A coil housing portion 17*b* is formed at a radially outer portion of the rotor 17 in an annular shape opening toward the armature member 15 (at the other end side of the rotor 17 in the axial direction thereof, at a lower portion in FIG. 2). At radially outer end portions of the rotor 17 on the surface facing the armature member 15, a plurality of engaging grooves 17*c* are formed. According to the embodiment, three engaging grooves 17*c* are equiangularly formed so as to have an interval of 120 degrees therebetween in the circumferential direction of the rotor 17 (in FIG. 1, only two of three engaging grooves 17*c* are shown). Further, a plurality of through holes 17*d* (in FIG. 2, only one of them is shown) is formed at the rotor 17 so as to pass through a bottom portion of the coil housing portion 17*b* in the axial direction of the rotor 17.

As shown in FIG. 2, the coil member 19 is housed and supported at the coil housing portion 17*b* of the rotor 17. The coil member 19 is configured by a bobbin 19*a* and a coil 19*b* wound around the bobbin 19*a*. A protruding portion 19*c* of the bobbin 19*a* is inserted into the through hole 17*d*, thereby stopping a rotation of the coil member 19 relative to the rotor 17. In other words, the coil member 19 is supported by the coil housing portion 17*b* so as to rotate integrally with the rotor 17.

On an outer circumferential surface of the rotor 17, the sensor magnet 21 is fixed by means of the fixing member 20. Specifically, the sensor magnet 21 is formed in an annular shape where poles (S-pole and N-pole) are alternately set in a circumferential direction of the sensor magnet 32 so that a magnetic field changing in a circumferential direction is generated.

Figure 5:
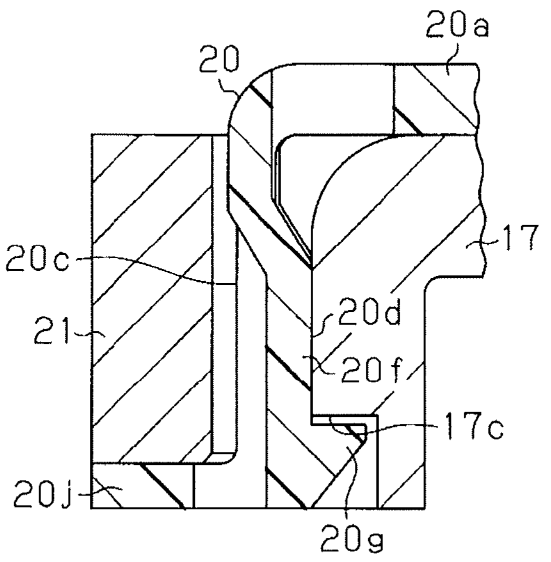
FIG. 5 illustrates a partial enlarged sectional view for explaining a fixing member of the driving device according to the embodiment.
Figure 6:
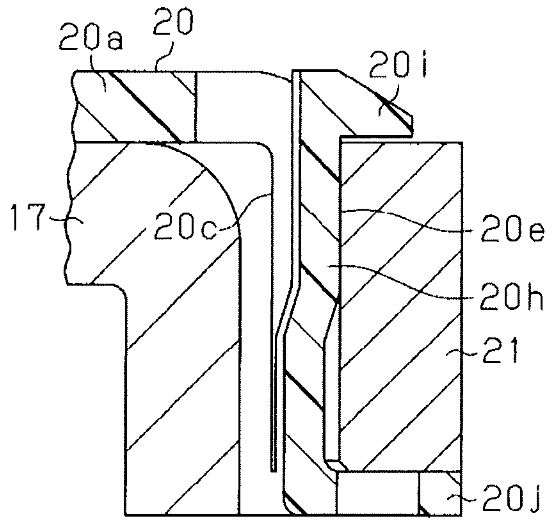
FIG. 6 illustrates a partial enlarged sectional view for explaining the fixing member of the driving device according to the embodiment.

The fixing member 20 is made of resin and is formed in a cylinder shape having a cylinder portion 20*c* and a bottom portion 20*a* on which a center through hole 20*b* is formed. On the cylinder portion 20*c* of the fixing member 20, first claw portions 20*d* and second claw portions 20*e* are integrally formed as illustrated in FIG. 5. The first claw portion 20*d* is engaged with the rotor 17 by press-fitting in the radial direction of the fixing member 20, and the second claw portion 20*e* is engaged with the sensor magnet 21 by press-fitting in the radial direction of the fixing member 20 as illustrated in FIG. 6.

According to the embodiment, three first claw portions 20*d* are equiangularly formed so as to have an interval of 120 degrees therebetween in the circumferential direction of the fixing member 20, and as illustrated in FIG. 5, each of the first claw portions 20*d* includes a first piece 20*f* and a first bending portion 20*g*. The first piece 20*f* is formed so as to extend from the bottom portion 20*a* of the cylinder portion 20*c* toward an opening portion of the fixing member 20. The first bending portion 20*g* is formed so as to extend from an end of the first piece 20*f* inwardly in a radial direction of the fixing member 20. The fixing member 20 is fixed to the rotor 17 at the first claw portions 20*d* in such a way that, in a state where the rotor 17 is inserted in the cylinder portion 20*c* of the fixing member 20 so as to contact the bottom portion 20*a*, each of the first bending portions 20*g* is engaged with the engaging groove 17*c* so that the rotor 17 is sandwiched in an axial direction thereof between the bottom portion 20*a* and the first bending portion 20*g*. In this configuration, because the first piece 20*f* is arranged slightly radially inward relative to the inner peripheral surface of the cylinder portion 20*c*, the first piece 20*f* is normally press-fitted to the outer circumferential surface of the rotor 17 in the radial direction of the fixing member 20.

According to the embodiment, three second claw portions 20*e* are equiangularly formed so as to have an interval of 120 degrees therebetween in the circumferential direction of the fixing member 20. As illustrated in FIG. 6, each of the second claw portions 20*e* is formed with a second piece 20*h* and a second bending portion 20*i*. The second piece 20*h* is formed so as to extend from the opening portion of the cylinder portion 20*c* toward the bottom portion 20*a*, and the second bending portion 20*i* is formed so as to extend from an end of the second piece 20*h* outwardly in the radial direction of the fixing member 20. At the opening portion of the cylinder portion 20*c*, a flange portion 20*j* is formed so as to extend outwardly in the radial direction of the fixing member 20. In this configuration, the sensor magnet 21 is fitted onto an outer circumferential surface of the cylinder portion 20*c* of the fixing member 20 so as to contact the flange portion 20*j*. Specifically, the sensor magnet 21 is held by means of the claw portions 20*e* in such a way that, in a condition where the sensor magnet 21 is placed on the cylinder portion 20*c* and contacts the flange portion 20*j*, the sensor magnet 21 is sandwitched between the flange portion 20*j* and the second bending portion 20*i* in an axial direction of the fixing member 20. The second pieces 20*h* are arranged at a slightly radially outer portion relative to the outer circumferential surface of the cylinder portion 20*c*, so that the second pieces 20*h* are press-fitted to an inner circumferential surface of the sensor magnet 21 in the radial direction of the fixing portion 20. The first claw portion 20*d* and the second claw portion 20*e* are equiangularly and alternately formed in the circumferential direction of the fixing portion 20 having an interval of 60 degrees there between.

A brush 34 at an anode side and a brush 35 at a cathode side, each serving as a first power feeding member at the magnetic force generating means, are fixed to the fixing member 20 by means of biasing plate springs 36 and 37, respectively. The biasing plate springs 36 and 37 are arranged so as to extend inwardly in a radial direction of the fixing member 20 and upwardly toward the case cover 12 (toward an opposite direction to the cylinder portion 20*c*), and the brushes 34 and 35 are fixed to ends of the biasing plate springs 36 and 37, respectively. The positions of the biasing plate springs 36 and 37 are displaced from each other in the radial direction of the fixing member 20, so that the brush 34 at the anode side and the brush 35 at the cathode side are displaced in the radial direction of the fixing member 20 in such a way that a distance from an axis of the fixing member 20 to the brush 34 differs from a distance from the axis of the fixing member 20 to the brush 35. Further, according to the embodiment, a conductive plate 38 at an anode side and a conductive plate 39 at a cathode side, each serving as a second power feeding member at the housing, are fixed to the case cover 12. Each of the conductive plates 38 and 39 are formed in an annular shape having different diameters. The brush 34 at the anode side is biased by the biasing plate spring 36 so as to press-contact (slidably contact) the conductive plate 38 at the anode side, and the brush 35 at the cathode side is biased by the biasing plate spring 37 so as to press-contact (slidably contact) the conductive plate 39 at the cathode side.

At the bottom portion 20*a* of the fixing member 20, a through hole 20*k* is formed, and an end portion of the projecting portion 19*c* of the coil member 19, after passing through the through hole 17*d* of the rotor 17, is inserted.

Within the control circuit portion 3, at a position opposite to an outer circumferential surface of the sensor magnet 21 in the radial direction of the fixing member 20, the hall IC 22 is attached to an inner circumferential surface of the sensor board 22*a* in order to detect a magnetic field change in the case cover 12.

The control circuit portion 3 also houses a control IC and various types of electric components within a housing of the control circuit portion 3 and is electrically connected to the hall IC 22 and the conductive plates 38 and 39 by being fixed to the case 11 of the output portion 2. An external connector is connected to the housing of the control circuit portion 3, and a power source control device is electrically connected via the external connector. A slide door for a vehicle is connected by means of a cable or the like to the end portion of the rotation shaft 18 externally protruding from the cylinder portion 11*d* of the case 11.

According to the driving device having the abovementioned configuration, in a case where the coil member 19 (see FIG. 2) is not energized, the flexible piece 14*c* of the plate spring 14 is not distorted, where the armature member 15 is located so as to be distant from the rotor 17, thereby establishing a disengaging state therebetween. In this state, a rotational force of the rotor 17 is not transmitted to the worm wheel 13, in other words the rotational force of the rotor 17 is not transmitted to the motor 1, where the slide door can be manually opened or closed in a simple manner. On the other hand, when the coil member 19 is energized thereby generating a magnetic force, the flexible piece 14*c* of the plate spring 14 is distorted by the generated magnetic force, where the armature member 15 is located so as to press-contact the rotor 17 (so as to be attracted), thereby establishing an engaging state therebetween in which the armature member 15 is integrally rotatably engaged with the rotor 17. In the engaging state, when the motor 1 (the worm wheel 13) is rotated, the rotational force of the motor 1 is transmitted to the power transmitting piece 14*b*, the annular portion 14*a*, the flexible piece 14*c* and the armature member 15 in the mentioned order, and the rotor 17 and the rotation shaft 18 are rotated together with the armature member 15. Accordingly, the slide door for the vehicle is actuated so as to be opened or closed. At this point, the rotation of the motor 1 is controlled on the basis of the change of the magnetic field (the magnetic field being changed corresponding to the position of the slide door during the opening-closing operation) detected by the hall IC 22.

(1) A driving device includes a first rotating member driven so as to rotate, an armature member being movable in an axial direction thereof together with the first rotating member and being rotatable integrally with the first rotating member, a second rotating member facing the armature member in the axial direction thereof and being rotatable relative to the armature member, a magnetic force generating means for generating a magnetic force by being energized, the magnetic force being used for attracting the armature member toward the second rotating member in order to establish a connection between the armature member and the second rotating member so as to be integrally rotatable, a sensor magnet fixed to the second rotating member for generating a magnetic field that changes in a circumferential direction of the sensor magnet, a sensor provided so as to face the sensor magnet in order to detect a change of the magnetic field and a fixing member formed with a first claw portion and a second claw portion, the first claw portion engaged with the second rotating member while being press-fitted thereto in a radial direction thereof and the second claw portion engaged with the sensor magnet while being press-fitted thereto in a radial direction thereof, wherein the sensor magnet is fixed to the second rotating member by means of the fixing member.

Thus, the sensor magnet 21 is fixed to the rotor 17 by means of the fixing member 20 to which the first claw portions 20*d* engaged with the rotor 17 by press-fitting thereto in a radial direction thereof and the second claw portions 20*e* engaged with the sensor magnet 21 by press-fitting thereto in a radial direction thereof are integrally formed. Compared to a known driving device where the sensor magnet is fixed to the rotor by use of adhesive agent, a mountability may be improved, at the same time, a manufacturing time may be shortened because a time for drying the adhesive agent may not be needed. Further, because the first claw portions 20*d* are engaged with the rotor 17 by press-fitting thereto in a radial direction thereof and the second claw portions 20*e* are engaged with the sensor magnet 21 by press-fitting thereto in a radial direction thereof, the sensor magnet 21 may be accurately positioned relative to the rotor 17 in the radial direction thereof while avoiding a damage to the sensor magnet 21 caused by heat expansion or the like. In other words, in a case where a sensor magnet is solidly fixed to the rotor made of other materials, because each member has a different heat expansion coefficient, the sensor magnet may be broken because of the difference of the heat expansion coefficients therebetween. On the other hand, in a case where a clearance is provided between the sensor magnet and the rotor, the sensor magnet may not be appropriately positioned in the radial direction thereof, and further, an error may occur at the sensor (hall IC 22) because of the misalignment of the sensor magnet. According to the driving device of the embodiment, because the fixing member 20 is provided therebertween, the damage to the sensor magnet and the misalignment of the sensor magnet may be eliminated.

(2) According to the embodiment, because the sensor magnet 21 is fixed to the outer circumferential surface of the rotor 17, a level of an adverse effect of the magnetic force caused by the coil member 19 may be reduced, the magnetic force being used for attracting the armature member 15 in the axial direction. In other words, because the sensor magnet 21 is provided radially outward relative to the magnetic force (a magnetic closed loop thereof) generated by the coil member 19, the sensor magnet 21 may not be adversely affected by the generated magnetic force, thereby reducing errors at the sensor (hall IC 22). Further, according to the embodiment, because the fixing member 20 is provided between the sensor magnet 21 and the outer circumferential surface of the rotor 17, compared to a case where the sensor magnet 21 is directly fixed to the outer circumferential surface of the rotor 17, the sensor magnet 21 is arranged radially outwardly by the thickness of the fixing member 20, accordingly the sensor magnet 21 may not be adversely affected by the magnetic force.

(3) According to the embodiment, the coil member 19 is fixed so as to be integrally rotatable with the rotor 17, and the brush 34 at the anode side and the brush 35 at the cathode side, being slidably contacting to the conductive plate 38 at the anode side and the conductive plate 39 at the cathode side provided at the case cover 12 through which the electric power is supplied to the coil member, are fixed to the fixing member 20. Accordingly, compared to a case where the brushes 34 and 35 are independently provided, the configuration of the driving device may be simplified.

(4) The second claw portions 20*e* are equiangularly formed at the fixing member 20 so as to have an interval of 120 degrees therebetween in the circumferential direction of the fixing member 20, thereby fixing the sensor magnet 21, formed in an annular shape, to the fixing member 20 in a balanced manner in the circumferential direction.

(5) The first claw portions 20*d* are equiangularly formed so as to have an interval of 120 degrees therebetween in the circumferential direction of the fixing member 20, thereby fixing the rotor 17 to the fixing member 20 in a balanced manner in the circumferential direction.

(6) The first claw portions 20*d* and the second claw portions 20*e* are equiangularly and alternately formed in the circumferential direction of the fixing member 20, thereby fixing the rotor 17 and the sensor magnet 21 to the fixing member 20 in a balanced manner in the circumferential direction.

According to the embodiment, the sensor magnet 21 is fixed to the outer circumferential surface of the rotor 17 by means of the fixing member 20, however, the sensor magnet 21 may be fixed to another portion of the rotor 17 unless being fixed by means of the fixing member 20 integrally formed with the first claw portions and the second claw portions, where the first claw portions are engaged with the rotor by press-fitting thereto in a radial direction thereof and the second claw portions are engaged with the sensor magnet by press-fitting thereto in a radial direction thereof. In this configuration, the sensor magnet needs to be fixed to another portion at which the sensor magnet may not be affected by a magnetic force (a magnetic closed loop thereof) of the coil member.

According to the embodiment, the fixing member 20 is provided between the sensor magnet 21 and the outer circumferential surface of the rotor 17, however the configuration may not be limited to this and may be modified in such a way that the sensor magnet directly contacts the outer circumferential surface of the rotor, where the rotor and the sensor magnet are provided between the first claw portion and the second claw portion in the radial direction of the fixing member. In other words, the sensor magnet may be fixed to the outer circumferential surface of the rotor so as to directly contact thereto by means of and by actuation of the fixing member. In this configuration, because the sensor magnet 21 is arranged radially outwardly in the radial direction relative to the magnetic force (a magnetic closed loop thereof) of the coil member 19, the sensor magnet may not be affected by the magnetic force, thereby reducing errors at the sensor (the hall IC 22).

According to the embodiment, the coil member 19 is fixed so as to be integrally rotatably with the rotor 17, however the configuration is not limited to this and may be modified in such a way that the coil member 19 is fixed to the case cover 12 so as to face the rotor 17. In this configuration, the fixing member 20 may not have the brush 34 at the anode side and the brush 35 at the cathode side, and the case cover 12 may not have the conductive plate 38 at the anode side and the conductive plate 39 at the cathode side.

According to the embodiment, the conductive plate 38 at the anode side and the conductive plate 39 at the cathode side, each serving as a power feeding member at the housing, are provided at the case cover 12, and the brush 34 at the anode side and the brush 35 at the cathode side, each serving as a power feeding member at the magnetic force generating means, are provided at the fixing member 20, however each power feeding member may be modified to other members being electrically connected by sliding with each other. For example, a brush serving as a power feeding member at the housing may be provided at the case cove r12, and a conductive plate formed in an annular shape serving as a power feeding member at the magnetic force generating means may be provided at the fixing member 20. Further, the power feeding member at the magnetic force generating means may be fixed to the rotor 17 (not fixed to the fixing member 20) in another configuration.

The second claw portions 20*e* are equiangularly formed so as to have an interval of 120 degrees therebetween in the circumferential direction of the fixing member 20, however the configuration is not limited to this, and the second claw portions 20*e* are formed so as to have uneven angles therebetween. The number of the second claw portions 20*e* may be changed, and any number of the second claw portions 20*e* may be formed.

The first claw portions 20*d* are equiangularly formed so as to have an interval of 120 degrees therebetween in the circumferential direction of the fixing member 20, however the configuration is not limited to this, and the first claw portions 20*d* are formed so as to have uneven angles therebetween. The number of the first claw portions 20*d* may be changed, and any number of the first claw portions 20*d* may be formed.

According to the embodiment, the first claw portions 20*d* and the second claw portions 20*e* are equiangularly and alternately formed (so as to have an interval of 60 degrees) in the circumferential direction of the fixing member 20, however the configuration is not limited to this and may be modified in such a way that, for example, tow first claw portions 20*d* are sequentially formed in the circumferential direction of the fixing member 20.

According to the embodiment, the hall IC 22 is used as a sensor, however, any types of sensors may be used as the sensor as long as it detects changes of the magnetic field generated by the sensor magnet. Further, the driving device according to the embodiment is used for opening and closing the slide door for a vehicle; however, the driving device may be translated so as to execute other actuations.

(7) According to the embodiment, the power transmitting piece 14*b* is formed with the rotationally engaging surfaces 14*d*, formed on surfaces extending along the thickness direction of the power transmitting piece 14*b*, being engagable with the engagable protruding portions 13*g* and 13*h* in the rotational direction of the worm wheel 13 (specifically, engaging with side surfaces of the first power transmitting portions 13*i*). Accordingly, compared to a known rotating device in which a plate spring is connected to a worm wheel (the first rotating member) by means of a tightening member (a screw or a rivet) or the like, a level of a load intensively applied to a certain portion (e.g., a portion at which the worm wheel 13 is connected to the plate spring 14, in the embodiment, connecting portions between the press-fit portions 14*e* and the press-fit receiving portions 13*c*) may be lowered. As a result, the thickness of the plate spring 14 may be reduced (the thickness of the plate spring 14 may not be unnecessarily increased) while avoiding damages and deformations at the connecting portions (the connecting portions between the press-fit portions 14*e* and the press-fit receiving portion 13*c* according to the embodiment). Further, because the flexible function of the plate spring 14 is set only at the flexible piece 14*c*, even in a state where the armature member 15 is attracted (press-contacted) to the rotor 17, a position of the transmitting piece 14*b* is not moved and is stable in the axial direction of the plate spring 14. Accordingly, the rotationally engaging surfaces 14*d* of the plate spring 14 may be normally engaged with the worm wheel 13 in the rotational direction thereof at a constant area, thereby stably lowering a level of a load intensively applied to the engaging portions.

(8) Because the plate spring 14 is formed in a manner where the power transmitting pieces 14*b* connected to the worm wheel 13 and the flexible pieces 14*c* connected to the armature member 15 are formed so as to extend radially outwardly from the annular portion 14*a* of the plate spring 14, compared to the driving device where those pieces are formed so as to extend radially inwardly, the connecting portions at which the plate spring 14 is connected to both of the worm wheel 13 and the armature member 15 may be located further away from the center of the rotation shaft. Accordingly, compared to the driving device in which those pieces are formed so as to extend radially inwardly, a level of a load intensively applied to certain portions (e.g., the connecting portions) may be lowered.

(9) According to the embodiment, the power transmitting piece 14*b* is formed with the press-fit portion 14*e* extending in the thickness direction, and the press-fit portion 14*e* is press-fitted into the press-fit receiving portion 13*c* formed at the worm wheel 13, thereby connecting the power transmitting piece 14*b* to the worm wheel 13. Accordingly, compared to the driving device where those components are connected by means of the tightening member (e.g., a screw or a rivet), a number of parts may be reduced, at the same time an assembling operation may be simplified.

(10) According to the embodiment, each of the press-fit portions 14*e* is formed with the press-fit rotationally engaging portions 14*f* formed so as to extend outwardly in the radial direction of the plate spring 14, and the press-fit rotationally engaging portions 14*f* are arranged so as to be engaged with the inner wall surface of the press-fit receiving portion 13*c* in the rotational direction of the worm wheel 13. In this configuration, a load may be applied to a wide area in the radial direction of the plate spring 14, and a situation where a load is intensively applied to a certain portion (e.g., the rotationally engaging surfaces 14*d* or the like) of the plate spring 14 may be eased.

(11) The arc portion 14*h* of the plate spring 14 is formed so as to protrude from each end of the bending portion 14*g* in a circumferential direction, the bending portion 14*g* being formed by bending from an end portion of the power transmitting piece 14*b* so as to include a plane that is orthogonal to the radial direction of the plate spring 14. The press-fit rotationally engaging portion 14*f* is formed by bending at an end of the each arc portion 14*h*. In this configuration, flexibility may easily be applied to the press-fit portion 14*e*, thereby establishing the press-contact of the press-fit rotationally engaging portions 14*f* to the inner wall portion of the press-fit receiving portion 13*c* (at the radially extending recessed portions 13*e*) in the circumferential direction of the plate spring 14. While the press-fit portion 14*e* is press-fitted into the press-fit receiving portion 13*c*, because the press-fit rotationally engaging portion 14*f* is arranged so as to press-contact to the inner wall portion of the press-fit receiving portion 13*c* (at the radially extending recessed portions 13*e*) in the circumferential direction of the plate spring 14, the plate spring 14 is firmly press-fitted to the worm wheel 13, at the same time a situation where the load is intensively applied to the certain portion (e.g., the rotationally engaging surface 14*d* or the like) of the plate spring 14 may be eased.

In a case where a press-fit rotationally engaging portion is formed without providing the abovementioned flexibility, an additional structure by which the plate spring 14 is firmly press-fitted to the worm wheel 13 may be provided at another portion, or the press-fit rotationally engaging portion may not be preferably engaged with the inner wall portion of the press-fit receiving portion (in the circumferential direction) because a clearance may be formed therebetween, accordingly, the load may be intensively applied to a certain portion (e.g., the rotationally engaging surface 14*d* or the like) of the plate spring 14. According to the embodiment, such situation may be eased and furthermore, because the arc portions 14*h* are formed so as to extend in the circumferential direction relative to the rotation shaft 18, rigidity against the rotational force may be enhanced.

(12) On the surfaces of the flexible pieces 14*c* in the thickness direction of the plate spring 14, the first output side rotationally engaging surfaces 14*i* are formed so as to be engaged with the engagable protruding portions 13*g* and 13*h* (the side surfaces of the second power transmitting portions 13*j*) of the worm wheel 13 in the rotational direction thereof. Accordingly, a situation where a load is intensively applied to a certain portion (e.g., the connecting portion between the armature member 15 and the plate spring 14, specifically the fastening thought hole 14*j* and the rivet 31 in the embodiment) of the plate spring 14 may be eased. Although a position of the flexible piece 14*c* is partially changed (displaced) in the axial direction of the plate spring 14 because the armature member 15 is attracted so as to press-contact the rotor 17 (the flexible pieces 14*c* are is largely displaced in the axial direction at a radially outer portion thereof at which being connected to the armature member 15), because the flexible piece 14*c* is still engaged with the worm wheel 13 in the rotational direction of the worm wheel 13 at a portion closer to the annular portion 14*a*, the situation where the load is intensively applied to the certain portion may be eased.

According to the embodiment, the inner surface of the through hole 14*k* of each flexible piece 14*c* (a surface extending in the thickness direction) is set as the second output side rotationally engaging surface 14*l* being engagable with the subsidiary engagable protruding portion 13*k* of the worm wheel 13 in the rotational direction thereof. Accordingly the situation where the load is intensively applied to the certain portion (e.g., the connecting portion between the armature member 15 and the plate spring 14) may further be eased.

(13) The plate spring 14 is connected to the armature member 15 at the end portion the flexible piece 14*c*, and the flexible piece 14*c* is formed with the through hole 14*k* passing through in the thickness direction at a center portion in the radial direction thereof. Accordingly, the flexible piece 14*c* is not easily deformed due to a tensional force other than in the rotational direction, while maintaining a spring characteristic (flexibility in the axial direction) appropriately contributing to the movement of the armature member 15 in the axial direction.

(14) The power transmitting pieces 14*b* and the flexible pieces 14*c* are equiangularly and alternately formed so as to have an interval of 60 degrees therebetween in the circumferential direction of the plate spring 14, thereby transmitting the rotational force in a balanced manner.

(15) The bearing 16, being fixed to the center through hole 13*a* of the worm wheel 13 and to which the rotation shaft 18 integrally rotating with the rotor 17 is relatively rotatably inserted, is formed with the regulating portion 16*a* at which the movement of the annular portion 14*a* of the plate spring 14 relative to the worm wheel 13 in the axial direction is regulated.

Accordingly, the power transmitting piece 14*b* may not be deformed in the axial direction while reducing the increase of the number of the components. The deformation of the power transmitting piece 14*b* in the axial direction may be prevented in a state where the position of the power transmitting piece 14*b* in the axial direction is constantly set, and the rotationally engaging surface 14*d* is normally engaged with the worm wheel 13 in the rotational direction at a certain area, thereby contributing to ease the situation where the load is intensively applied to the certain portion.

The embodiment mentioned above may be modified as follows. The power transmitting piece 14*b* connected to the worm wheel 13 and the flexible piece 14*c* connected to the armature member 15 are formed so as to extend outwardly from the annular portion 14*a* in the radial direction of the plate spring 14, however the power transmitting piece 14*b* and the flexible piece 14*c* may be formed so as to extend inwardly from the annular portion in the radial direction of the plate spring 14.

The power transmitting piece 14*b* of the embodiment is connected to the worm wheel 13 in such a way that the press-fit portion 14*e* of the power transmitting piece 14*b* is press-fitted into the press-fit receiving portion 13*c*, however, the power transmitting piece 14*b* may be connected to the worm wheel 13 by means of a tightening member (a screw, a rivet or the like). Further, in the embodiment, the flexible piece 14*c* is connected to the armature member 15 by means of the rivet, however, the flexible piece 14*c* may be connected to the armature member 15 by other configurations such as a press-fitting.

The configuration of the press-fit portion 14*e* (including the bending portion 14*g*, the arc portions 14*h* and the press-fit rotationally engaging portions 14*f*) of the embodiment may be modified together with the shape of the press-fit receiving portion 13*c* as long as the press-fit portion 14*e* can be press-fitted into the press-fit receiving portion 13*c* of the worm wheel 13. For example, according to the embodiment, the press-fit portion 14*e* is formed with the press-fit rotationally engaging portions 14*f* engaging with the inner wall portions of the press-fit receiving portions 13*c* (the radially extending recessed portion 13*e*) in the rotational direction, however, the press-fit rotationally engaging portions 14*f* may be formed so as to extend inwardly in the radial direction of the plate spring 14, or the press-fit rotationally engaging portions 14*f* (radially extending recessed portion 13*e*) may not even be formed.

According to the embodiment, each of the flexible pieces 14*c* is formed with the first output side rotationally engaging surfaces 14*i* and the second output side rotationally engaging surface 14*l*, at which the flexible piece 14*c* is engagable with the worm wheel 13 in the rotational direction thereof, however the configuration of the flexible piece 14*c* is not limited to this and may be modified so as not to include the first and second output side rotationally engaging surfaces 14*i* and 14*l*.

According to the embodiment, the flexible piece 14*c* is formed with the through hole 14*k* provided at the central portion in the radial direction thereof so as to pass through in the thickness direction thereof, however the configuration of the flexible piece 14*c* is not limited to this and may be modified so as not to include the through hole 14*k*.

According to the embodiment, the power transmitting pieces 14*b* and the flexible pieces 14*c* are equiangularly and alternately formed so as to have the interval of 60 degrees therebetween in the circumferential direction of the plate spring 14, however the configuration of the power transmitting pieces 14*b* and the flexible pieces 14*c* are not limited to this and may be modified so as to have various degrees of intervals therebetween. Further, the number of the power transmitting pieces 14*b* and the number of the flexible pieces 14*c* may be changed.

According to the embodiment, the bearing 16 at which the regulating portion 16*a* is integrally formed is fixed to the center through hole 13*a* of the worm wheel 13, however the configuration of the worm wheel 13 and the bearing 16 is not limited to this and may be modified so as not to include the integrally formed regulating portion 16*a*.

According to the embodiment, each of the power transmitting pieces 14*b* is formed with the rotationally engaging surfaces 14*d*, however the configuration of the power transmitting piece 14*b* is not limited to this and may be modified in such a way that the power transmitting piece 14*b*, without providing the rotationally engaging surfaces 14*d*, is engaged with the worm wheel 13, without providing the engagable protruding portions 13*g* and 13*h*. In this configuration, the power transmitting piece 14*b* connected to the worm wheel 13 and the flexible piece 14*c* connected to the armature member 15 are formed so as to extend outwardly from the annular portion in the radial direction of the plate spring 14 in order to lower a level of a load intensively applied to a certain portion (e.g., the engaging portion).

According to the embodiment, in a state where the coil member 19 (see FIG. 2) is not energized, the flexible pieces 14*c* of the plate spring 14 are not deformed and are arranged on the same plane where the annular portion 14*a* and the power transmitting piece 14*b* (except the press-fit portion 14*e*) are formed, however the configuration of the plate spring 14 is not limited to this and may be modified in such a way that the flexible pieces 14*c* of the plate spring 14 are slightly deformed when the coil member 19 is not energized. Specifically, the worm wheel 13 may be formed so as to include a step portion, slightly protruding outwardly, at a portion where the flexible piece 14*c* overlaps. In this modified configuration, while the armature member 15 is pulled toward the worm wheel 13, other portions of the plate spring 14 (e.g., the power transmitting piece 14*b*) may not contacts the armature member 15, accordingly noise caused by the contact may not be generated.

According to the embodiment, the power transmitting piece 14*b* is formed in such a way that a width thereof seen in the axial direction is slightly smaller than a distance between the engaging protruding portions 13*g* and 13*h*, provided as a pair (specifically a distance between the first power transmitting portion 13*i* of the engagable protruding portion 13*g* and the first power transmitting portion 13*i* of the engagable protruding portion 13*j*), to an extend where the power transmitting piece 14*b* is easily inserted in the axial direction, however the power transmitting piece 14*b* is formed so as to be engagable in the rotational direction with the engaging protruding portions 13*g* and 13*h*. For example, the power transmitting piece 14*b* may be formed so as not to allow a clearance between itself and the engagable protruding portions 13*g* and 13*h* in the circumferential direction. In this configuration, although a level of mountability of the power transmitting piece 14*b* may be lowered, a backlash between the power transmitting piece 14*b* and the engagable protruding portions 13*g* and 13*h* in the rotational direction may be eliminated. The width of the power transmitting piece 14*b* may be set so as to include no clearance in the rotational direction because of the deformations of the plate spring 14 and the like in order to establish an engagement between the engagable protruding portions 13*g* and 13*h* (the surfaces of the first power transmitting portion 13*i*) and the rotationally engaging surfaces 14*d*.

According to the embodiment, the sensor magnet 21 is fixed to the rotor 17 by means of the fixing member 20, however the sensor magnet 2 may be fixed to the rotor 21 by use of adhesive agents.

According to the embodiment, the coil member 19 is fixed so as to be integrally rotatable with the rotor 17, however, the coil member 19 may be fixed to the case cover 12 so as to face the rotor 17. In this configuration, the fixing member 20 may not have the brush 34 at the anode side and the brush 35 at the cathode side, and the case cover 12 may not have the conductive plate 38 at the anode side and the conductive plate 39 at the cathode side.

According to the embodiment, the driving device is used for opening or closing the slide door for a vehicle, however the driving device may be translated to execute other actuations.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving device comprising:

a first rotating member driven so as to rotate;

an armature member being movable in an axial direction thereof together with the first rotating member and being rotatable integrally with the first rotating member;

a second rotating member facing the armature member in the axial direction thereof and being rotatable relative to the armature member;

a magnetic force generating means for generating a magnetic force by being energized, the magnetic force being used for attracting the armature member toward the second rotating member in order to establish a connection between the armature member and the second rotating member so as to be integrally rotatable;

a sensor magnet fixed to the second rotating member for generating a magnetic field that changes in a circumferential direction of the sensor magnet;

a sensor provided so as to face the sensor magnet in order to detect a change of the magnetic field; and a fixing member formed with a first claw portion and a second claw portion, the first claw portion engaged with the second rotating member while being press-fitted thereto in a radial direction thereof and the second claw portion engaged with the sensor magnet while being press-fitted thereto in a radial direction thereof, wherein the sensor magnet is fixed to the second rotating member by means of the fixing member.

2. The driving device according to claim 1, wherein the sensor magnet is fixed to an outer circumferential surface of the second rotating member by means of the fixing member.

3. The driving device according to claim 1, wherein the magnetic force generating means is fixed to the second rotating member so as to be integrally rotatably, and the fixing member includes a first power feeding member at the magnetic force generating means so as to be fixed thereto, the first power feeding member arranged so as to slide on a second power feeding member at a housing in order to feed an electric power to the magnetic force generating means via the second power feeding member.

4. The driving device according to claim 1, wherein the sensor magnet is formed in an annular shape, and the fixing member includes a plurality of the second claw portions arranged equiangularly in a circumferential direction of the fixing member.

5. The driving device according to claim 1, wherein the fixing member includes a plurality of the first claw portions arranged equiangularly in the circumferential direction of the fixing member.

6. The driving device according to claim 1, wherein the first claw portions and the second claw portions are formed alternately to each other in the circumferential direction of the fixing member.

7. The driving device according to claim 1 further includes a plate spring, having a flexibility, provided between the first rotating member and the armature member for connecting the first rotating member to the armature member and for being deformed when the armature member is attracted toward the second rotating member by means of the magnetic force generating means, wherein the plate spring includes: an annular portion; a plurality of power transmitting pieces formed so as to extend in a radial direction of the plate spring from the annular portion and to be connected to the first rotating member, the power transmitting pieces being arranged in a circumferential direction of the plate spring; and a plurality of flexible pieces formed so as to extend in the radial direction of the plate spring from the annular portion and having a flexibility whose level is greater than that of the power transmitting piece and to be connected to the armature member, the flexible pieces being arranged in the circumferential direction of the plate spring, and wherein the power transmitting piece includes a rotationally engaging surface formed so as to extend in a thickness direction of the power transmitting piece, at which the power transmitting piece engages the first rotating member in a rotational direction thereof.

8. The driving device according to claim 1, wherein each of the power transmitting pieces and the flexible pieces are formed so as to extend from the annular portion outwardly in a radial direction of the plate spring.

9. The driving device according to claim 1, wherein the power transmitting piece includes a press-fit portion formed by bending so as to extend in the thickness direction of the plate spring, and the power transmitting piece is connected to the first rotating member in such a way that the press-fit portion is press-fitted into the press-fit receiving portion of the first rotating member.

10. The driving device according to claim 1, wherein the press-fit portion includes a press-fit rotationally engaging portion formed so as to extend in a radial direction of the plate spring, the press-fit rotationally engaging portion being engaged with an inner wall of the press-fit receiving portion of the worm wheel in a rotational direction thereof.

11. The driving device according to claim 1, wherein the press-fit portion includes: a bending portion formed by bending at an end portion of the power transmitting piece so as to have a surface that extends in a direction orthogonal to a radial direction of the plate spring; an arc portion formed so as to extend from the bending portion in a circumferential direction of the plate spring; and the press-fit rotationally engaging portion formed by bending at an end portion of the arc portion, and wherein the press-fit rotationally engaging portion is arranged so as to press-contact to the inner wall of the press-fit receiving portion in the circumferential direction of the plate spring when the press-fit portion is press-fitted into the press-fit receiving portion.

12. The driving device according to claim 1, wherein the flexible piece includes an output side rotationally engaging surface being engaged with the first rotating member in a rotational direction thereof and formed on a surface extending in a thickness direction of the plate spring.

13. The driving device according to claim 1, wherein the flexible piece is connected to the armature member at an end portion thereof and is formed with a through hole at an intermediate portion in a radial direction of the flexible piece so as to pass through in a thickness direction thereof.

14. The driving device according to claim 1, wherein the power transmitting pieces and the flexible pieces are formed equiangularly and alternately to each other in the circumferential direction of the plate spring.

15. The driving device according to claim 1, wherein the power transmitting piece and the flexible piece are formed so as to extend from the annular portion radially outwardly, and into a center through hole of the first rotating member, a bearing through which a rotation shaft being integrally rotatable with the second rotating member is inserted is fixed, and the bearing is formed integrally with a regulating portion by which a movement of the annular portion relative to the first rotating member in an axial direction thereof is regulated.

* * * * *